US011411851B2

(12) United States Patent
Brosnan et al.

(10) Patent No.: US 11,411,851 B2
(45) Date of Patent: *Aug. 9, 2022

(54) NETWORK SENSOR DEPLOYMENT FOR DEEP PACKET INSPECTION

(71) Applicant: Rapid7, Inc., Boston, MA (US)

(72) Inventors: John Brosnan, Galway (IE); Jeff Myers, Somerville, MA (US); Andriy Lyubka, Galway (IE); Darragh Delaney, Claremorris (IE); Erran Carey, Newtownabbey (GB); Martin Hutchings, Lisburn (GB); Ralph McTeggart, Belfast (GB); Ryan Williams, Belfast (GB); Daniel Skelton, Belfast (GB); Luke Coughlan, Galway (IE); Gianpaolo Tedesco, Seoul (KR); Luis Ramos dos Santos Lopes, Galway (IE); Lars-Kristian Svenoy, Belfast (GB); Dan-Adrian Moinescu, Braila (RO); Niall Cochrane, Belfast (GB); Morgan Doyle, Kinvara (IE); Sarah Addis, Belfast (GB)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,100

(22) Filed: Aug. 31, 2021

(65) Prior Publication Data

US 2021/0399969 A1 Dec. 23, 2021

Related U.S. Application Data

(63) Continuation of application No. 16/874,962, filed on May 15, 2020, now Pat. No. 11,133,999.

(51) Int. Cl.
*H04L 67/12* (2022.01)
*H04L 41/046* (2022.01)
(Continued)

(52) U.S. Cl.
CPC .......... *H04L 43/0894* (2013.01); *G06F 9/445* (2013.01); *G06F 9/455* (2013.01); *H04L 47/2441* (2013.01); *H04L 47/35* (2013.01); *H04L 47/36* (2013.01); *H04L 63/06* (2013.01); *H04L 63/14* (2013.01); *H04L 67/12* (2013.01); *H04L 41/046* (2013.01); *H04L 41/0806* (2013.01)

(58) Field of Classification Search
CPC . H04L 41/0895; H04L 41/0803; H04L 41/08; H04L 41/085; H04L 63/14; H04L 41/046; H04L 41/0806; G06F 9/455
See application file for complete search history.

(56) References Cited

U.S. PATENT DOCUMENTS 10,693,899 B2 6/2020 Levin et al.
2010/0313196 A1 12/2010 De Atley et al.
(Continued)

*Primary Examiner* — Tonia L Dollinger
*Assistant Examiner* — Linh T. Nguyen
(74) *Attorney, Agent, or Firm* — Ashwin Anand; Lei Sun

(57) ABSTRACT

Disclosed herein are methods, systems, and processes for centralized containerized deployment of network traffic sensors to network sensor hosts for deep packet inspection (DPI) that supports various other cybersecurity operations. A network sensor package containing a pre-configured network sensor container is received by a network sensor host from a network sensor deployment server. Installation of the network sensor package on the network sensor host causes execution of the network sensor container that further causes deployment of an on-premise network sensor along with a network sensor management system, a DPI system, and an intrusion detection/prevention (IDS/IPS) system. The configurable on-premise network sensor is deployed on multiple operating system distributions of the network sensor host and generates actionable network metadata using DPI techniques for optimized log search and management and improved intrusion detection and response (IDR) operations.

20 Claims, 6 Drawing Sheets

(51) Int. Cl.
*H04L 43/0894* (2022.01)
*H04L 47/35* (2022.01)
*H04L 9/40* (2022.01)
*H04L 47/36* (2022.01)
*H04L 47/2441* (2022.01)
*G06F 9/445* (2018.01)
*G06F 9/455* (2018.01)
*H04L 41/0806* (2022.01)

(56) References Cited

U.S. PATENT DOCUMENTS

| | | | |
|---|---|---|---|
| 2012/0294192 A1 | 11/2012 | Masood et al. | |
| 2014/0122670 A1* | 5/2014 | Levy | H04L 41/40 709/223 |
| 2014/0123140 A1* | 5/2014 | Motoki | H04L 41/0806 718/1 |
| 2016/0039295 A1 | 2/2016 | Madurai-Kumar et al. | |
| 2016/0337329 A1 | 11/2016 | Sood et al. | |
| 2017/0093922 A1 | 3/2017 | Duan | |
| 2017/0154017 A1 | 6/2017 | Kristiansson et al. | |
| 2018/0060059 A1* | 3/2018 | Wang | G06F 9/45558 |
| 2018/0227182 A1* | 8/2018 | Patton | H04L 41/0806 |
| 2018/0287999 A1 | 10/2018 | Kaushik | |
| 2019/0068456 A1* | 2/2019 | Lotfi | G06F 11/3006 |
| 2019/0215332 A1* | 7/2019 | Kaplan | H04L 43/0876 |
| 2019/0273718 A1* | 9/2019 | Ahuja | H04L 49/70 |
| 2019/0392117 A1 | 12/2019 | Viswanathan et al. | |
| 2020/0019414 A1 | 1/2020 | Byard et al. | |
| 2020/0351306 A1 | 11/2020 | Nedbal et al. | |
| 2021/0058388 A1 | 2/2021 | Knotwell et al. | |
| 2022/0046209 A1* | 2/2022 | Takahashi | G06F 11/00 |

\* cited by examiner

NETWORK SENSOR DEPLOYMENT FOR DEEP PACKET INSPECTION

CROSS-REFERENCE TO RELATED APPLICATIONS

This application is a continuation of U.S. patent application Ser. No. 16/874,962, filed May 15, 2020, which is hereby incorporated herein in its entirety.

BACKGROUND

Field of the Disclosure

This disclosure is related is to network security. In particular, this disclosure is related to methods and systems to deploy network sensors for deep packet inspection (DPI).

Description of the Related Art

Deep packet inspection (DPI) is an advanced method of examining and managing network traffic. DPI is a form of packet filtering that locates, identifies, classifies, reroutes, and/or blocks packets with specific data or code payloads that conventional packet filtering (which only examines packet headers) cannot detect. DPI can be used to check for malicious code.

DPI typically requires the installation and utilization of one or more network sensors on client devices called network sensor hosts. A network sensor captures network data traffic between users and infrastructure and between virtualized infrastructure resources. The raw network data traffic is then converted into valuable and actionable information (e.g., network metadata) that can provide valuable security-based assessments regarding the network, users of the network, devices operating on the network, and the like.

Existing network sensor deployment paradigms are slow, computing resource intensive, and cumbersome. For example, it is a significant technical challenge to efficiently and successfully deploy network traffic sensors on multiple operating system distributions as existing deployment methodologies often require specialized hardware, on-premise management of interactions, specialized knowledge of network traffic analysis systems, user intervention for updates, and the like. What's more, existing network sensor deployment mechanisms are unfortunately exceptionally computing resource intensive, resulting in wasteful storage and bandwidth consumption to collect, analyze, and act upon network metadata.

SUMMARY OF THE DISCLOSURE

Disclosed herein are methods, systems, and processes for improved and optimized (on-premise) network sensor deployment to perform deep packet inspection (DPI) and other cybersecurity operations in networked computing environments.

In certain embodiments, one such method, process, or system involves receiving (or downloading) a network sensor package from a network sensor deployment server at a network sensor host (or simply "sensor host"), installing the network sensor package on the network sensor host, receiving a network sensor container from the network sensor deployment server, executing the network sensor container on the network sensor host, and deploying a network sensor on the network sensor host (e.g., on multiple Linux distributions).

In some embodiments, the network sensor package is associated with a token and utilizes the token to obtain a certificate and a private key to establish secure communication with the network sensor deployment server to receive the network sensor container. The network sensor package includes at least a bootstrap, the network sensor container, and an agent. The network sensor package deploys the network sensor, the bootstrap starts the network sensor container on the network sensor host, and the network sensor container isolates network sensor applications executing on the network sensor host from a host operating system (OS) associated with the network sensor host. The network sensor container includes at least a network sensor deployment engine, a DPI engine, and an intrusion detection system (IDS) (e.g., Suricata).

In other embodiments, the network sensor deployment engine determines that the network sensor is in deployment mode, enumerates network interface cards (NICs) on the sensor host, transmits a topology status to the network sensor deployment server, and requests a configuration file from the network sensor deployment server. The network sensor deployment server identifies the network sensor, selects a network interface to utilize as a sensor interface, generates the configuration file, and transmits the configuration file to the network sensor. The network sensor downloads the configuration file, validates the configuration file, and initiates the DPI engine and the IDS. The network sensor transmits network events from the IDS and network metadata from the DPI engine to the network sensor deployment server via a socket associated with the network sensor host.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

Figure 1:
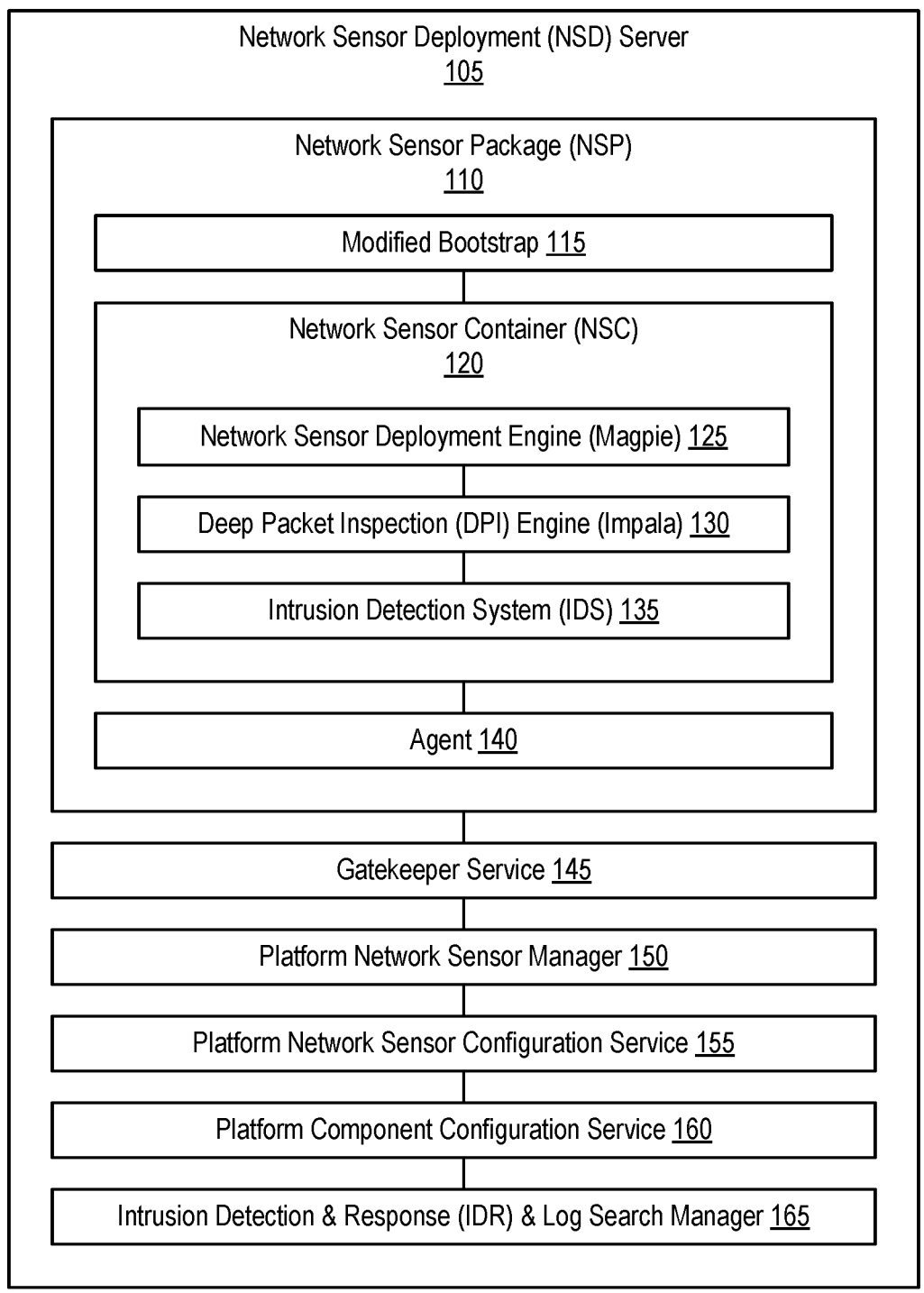
FIG. 1 is a block diagram 100 of a network sensor deployment (NSD) server, according to one embodiment of the present disclosure.

While the disclosure is susceptible to various modifications and alternative forms, specific embodiments of the disclosure in the specification and drawings are provided as examples and are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Network traffic analysis is a technique used to look at communication patterns on a computer network. Traffic analysis is the process of capturing and examining network data in order to deduce information from patterns in communication. In general, the more data that is captured, the more can be inferred from the traffic (e.g., the granularity of the captured network traffic data can be particularly useful for cybersecurity applications). At least two technologies can be used to perform traffic analysis on a network: flow analysis and packet analysis. Network sensors (e.g., on-premise network sensors) as disclosed and described herein can be used to perform network traffic analysis in the form of deep packet inspection (DPI). Therefore, efficiently deploying network sensors with minimal computing resource usage is of paramount importance.

Flow Analysis

A flow is a traffic stream (e.g., a network traffic data stream) with a common set of identifiers. Typically, a flow is defined by traffic that has the same source internet protocol (IP), destination IP, protocol, source port, and destination port. If any of these variables change, then a new flow is defined. For example, when a client is connecting to a server, several flows might be created because the client might establish several connections to the server, involving new source ports. Each one of these connections would be a separate flow. NetFlow, sFlow, IPFIX are all methodologies to collect information about traffic that is traversing a network.

Devices such as routers or switches along the traffic path can generate flow data, based on the traffic that is traversing them. The flow data is sent to a flow collector, which then creates reports and statistics from the flow updates. This process is called flow analysis. The packets sent to a flow collector are not copies of the actual packets in the traffic flow, as is the case in a SPAN (switched port analyzer) port. The flow analysis packets carry statistical data regarding the flow. Flow-based reporting is a good way to understand what traffic is traversing the network. Many network traffic collection applications deployed today use can track at least the following key fields: (1) Source interface, (2) Source and destination IP address, (3) Layer 4 protocol (e.g., ICMP, TCP, UDP, OSPF, ESP, and the like), (4) Source and destination port number (e.g., if the layer 4 protocol is TCP or UDP), and (5) Type of service value.

Packet Analysis

Although flow-based analysis solutions are useful and necessary, there are certain scenarios where packet capture and analysis is still needed. Packet analysis is normally associated with SPAN or mirror ports, which are available on various managed network switches. Port mirroring is used on a network switch to send a copy of network packets seen on one switch port (or an entire VLAN) to a network monitoring connection on another switch port. Port mirroring on a Cisco® network switch is generally referred to as Switched Port Analyzer (SPAN); other vendors use alternate names such as Roving Analysis Port (RAP) on 3Com® switches.

Deep packet inspection (DPI) applies to technologies that use packets as a data source and then extract metadata such as application or website names. In contrast, flow data in most cases does not provide any information about what is contained within packet payloads. For this reason, when analyzing an application, it is critical to use packet capture solutions because they let you see the actual packets involved in client conversations and identify the root cause of an issue. Content-based application recognition, which is based on DPI, can identify traffic by application, even when unusual or dynamic port numbers are used.

Flow Capture v. Packet Capture

Flow analysis can help to determine traffic statistics overall, but it falls short when analyzing a specific conversation in depth. A good example of this is web usage tracking. Existing network traffic collection applications are not good trackers because they do not provide support for HTTP (HyperText Transfer Protocol) headers. The HTTP header is the part of the application layer payload that actually specifies the website and URL (Universal Resource Locator) that is being requested. In this scenario, both analysis method should be used. When looking at traffic statistics, flow analysis is sufficient if one only wants to examine IP addresses and how much data they are transferring. However, when one wants to troubleshoot performance problems, in many cases one will need to examine the full packet detail(s). Therefore, monitoring solutions should use both flow analysis and packet analysis. However, as noted above, because flow data in many cases does not provide information about what is contained within packet payloads, DPI is implemented because DPI can use packets as a data source to provide network metadata (e.g., application names, website names, and other such granular details).

There are several differences between flow capture and packet capture: (1) flow capture features are normally found on layer 3 type devices like routers while packet capture uses SPAN or mirror ports which are available on most managed switches, (2) flow capture gives top-level information like IP addresses and traffic volumes whereas packet capture also gives this and more, (3) flow capture tools can struggle with the activity associated with content delivery networks and applications that use multiple TCP or UDP ports while packet capture is more accurate, (4) flow capture does not look at payloads contained within packets unless one is using advanced features like Next Generation Network based Application Recognition (NBAR2), and (5) packet capture provides 'names'=websites, users, applications, files, hosts, and so on, to permit identification of individuals/users and their access to and usage of resources.

Therefore, the methods, systems, and processes for network sensor deployment disclosed and described herein permit deep packet inspection to capture network packets from a network to perform analysis to extract information from the data carried in the packets. As noted, unlike flow analysis which only examines packet headers, DPI extracts information from headers, and more importantly, the packet payload.

Example Mobile Device Monitoring

Wire data is data contained within the headers and payloads of packets and their associated flow data as traffic moves from one node to another (e.g., from one computing device to another). Wire data is a rich source of user and application information. Wire data can be derived from SPAN ports (port mirroring), TAPs (test access points), packet brokers or locally on systems using promiscuous mode packet captures. Wire data analytics is the process by which raw packet data is transformed into real-time and historical business and IT (information technology) insight. Wire data analytics provides granular detail and full understanding of what is happening on wired and wireless networks. Gathering data off the wire can be accomplished without invasive probes or software agents that add overhead and complexity. Wire data capture does not require auditing on servers that can slow down business critical applications. Wire data analytics can be used for vendor neutral network security monitoring, user activity monitoring, root cause analysis., real time and historical troubleshooting, bandwidth usage analysis, web usage monitoring (both proxy and non-proxy), and network, device and user forensics.

In certain embodiments, the methods, systems, and processed disclosed herein (and in priority application (U.S. Provisional Patent Application No. 62/910,745 filed on Oct. 4, 2019) from which benefit is claimed) implement and provide a DPI system and a network sensor deployment system for deploying network sensors on-premise as well as investigating, monitoring, and reporting on user and network activity. The following optimizations, computing operations, and/or improvements are contemplated: (1) logging and reporting on activity by IP address and actual user name, (2) unique levels of detail using proprietary network metadata for critical protocols including SMB, HTTP and SQL, (3) wire data retained in a built in database, (4) ability to go back on data days, weeks or months without the need for expensive hardware and storage, (5) built in application recognition engine tracks usage by application and user name, (6) connection to a SPAN or mirror port to instantly monitor anywhere across a network, and (7) downloading and deployment on standard server hardware (e.g., VMware® or HyperV®).

Example Bandwidth Troubleshooting

In one embodiment, the methods, systems, and processes disclosed and described herein and in priority application Ser. No. 62/910,745 at least: (1) identify users and applications that are bandwidth intensive, (2) troubleshoot saturated links and network bottlenecks, (3) examine at a glance how bandwidth is being used across a WAN (wide area network), LAN (local area network), and/or Internet links, (4) examine details of usage by specific network links, users, clients, servers, applications, and/or websites, and/or (5) drill down to greater levels of detail, ultimately to details of the start-time, end-time, and size of each individual data transfer.

Example File Activity Monitoring

In another embodiment, the methods, systems, and processes disclosed and described herein and in priority application Ser. No. 62/910,745 at least: (1) determine who accessed or deleted files, (2) prevent data leakage and unauthorized access to confidential data, (3) examine exactly what is happening on file sharing infrastructure, (4) search for file activity by IP address, subnet, username, or file name, (5) identify the users who have accessed a file or file share over a specific time period, and/or (6) receive alerts to unusual file activity, such as large downloads by a single user over a short time period.

Example Network Security Monitoring

In some embodiments, the methods, systems, and processes disclosed and described herein and in priority application Ser. No. 62/910,745 at least: (1) add an extra dimension to an organization's IT security posture, (2) identify internal threats and get early warnings about zero-day threat activity, (3) use trends and alerts to identify suspicious activity like Ransomware, (4) detect port-scanning and port-sweeping activity, (5) identify instances of spam generation, and/or (6) utilize an optional security module that combines Snort intrusion detection with a database to create a unique historical IDS (intrusion detection system).

Example Network Forensics

In other embodiments, the methods, systems, and processes disclosed and described herein and in priority application Ser. No. 62/910,745 at least: (1) perform full packet capture, storage of historical network events, and comprehensive analytical capabilities, (2) analyze an incident by simply entering an IP address, subnet, or username, (3) respond to queries about network activity with all the pertinent facts, (4) troubleshoot network problems and identify anomalous or illegal behavior, and (5) identify misconfigured systems and deliberate or unwitting misuse of a network by authorized users.

Example Web Activity Monitoring

In certain embodiments, the methods, systems, and processes disclosed and described herein and in priority application Ser. No. 62/910,745 at least: (1) drill down into user activity by website, download type, and traffic volume, (2) track down viruses, malware, and other security issues, (3) provide visibility into the Internet traffic generated by the users on your network, (4) permit searching for web activity by IP address, subnet, username, or website name, (5) permit examination of the total amount of traffic generated in a year, to the date and time a user visited a specific web page, and (6) provide alerts, trends, reports, and drilldown capabilities associated with user Internet activity on a network.

The systems and methods disclosed herein and in priority application Ser. No. 62/910,745 can be implemented and embodied in a Local Area Network (LAN) Guardian (LANGuardian) computing system that can be deployed on networks with multiple core switches.

Example Application Monitoring (CBAR)

In certain embodiments, the methods, systems, and processes disclosed and described herein and in priority application Ser. No. 62/910,745 at least: (1) perform Application Monitoring (CBAR—Content Based Application Recognition) that enables LANGuardian to generate consolidated reports that show bandwidth and usage patterns from an application perspective, (2) uses DPI to analyze packet content as well as packet headers, (3) provide more detailed and accurate reporting than existing monitoring tools can provide, (4) eliminate reliance on source address, destination address, and port number to identify the application associated with network traffic, and (5) enable network engineers and system administrators to identify applications that use random port numbers or that use standard port numbers for non-standard purposes.

Example Unified Network Traffic Monitoring for Physical and Virtual Environments Network monitoring involves (1) capturing data from a network, (2) storing the data in a database on a central server, and (3) providing a web interface for access to the data. Network monitoring has the following benefits: (a) provides visibility into what is happening on the network in real-time, (b) provides notification when an event takes place that requires investigation, (c) enables troubleshooting of problems, and (d) provides an audit trail of network activity. Network monitoring in physical environments is agent-based, log-based, or traffic-based.

Agent-based tools are usually deployed as part of an enterprise management framework or network management system. Typically, an agent is installed on devices to be included in the monitoring regime. The central management server then communicates with the agent, and vice versa, using a protocol such as SNMP (Simple Network Management Protocol) or WMI (Windows Management Instrumentation). The server can poll the device to determine its status and issue commands to control the operation of the device, and the agent can issue alerts to the management server when changes occur or threshold values are breached on the device. Agent-based frameworks and tools tend to have a device-centric view of the network. They monitor device parameters such as uptime, disk usage, hardware status, bandwidth usage, and traffic volume, and aggregate the management data from individual devices to give a holistic view of the overall network. However, they do not generally provide detailed information about the network traffic, and when deployed on busy servers or network devices they can negatively affect performance.

For log-based tools, operating systems such as Windows and many versions of UNIX® typically maintain detailed log files of activity on the system—shutdowns, startups, logins, logouts, network connections, database accesses, and the like. Using the syslog format, it is possible to route all logging information to a centralized server. The syslog format is supported by many network switches and there are tools available to export Windows event logs to a syslog server, thereby making it possible for the network administrator to monitor the entire network from a single location. Centralized logging is a good way to strengthen the security of a networked environment. If an attacker gains access to a server that stores log files locally, they can modify the log files to hide all traces of his activity. If the log files are stored on a secure central system, the attacker will not be able to access them.

For traffic-based tools, every time network users access a web site, database, file share or other networked resource, they send information in data packets across the network—for example, the address of the website, the content of a SQL query, or the name and location of a file to be deleted. Modern network switches allow monitoring devices to be plugged into the switch and take a snapshot of the data flowing through it. Because this is made possible through the switch hardware and software, traffic analysis does not require agents to be installed and has no performance impact on the systems being monitored.

As previously noted, there are two approaches to modern traffic-based network monitoring: flow analysis and full packet capture. In computer networks, a sequence of data packets flowing from the same source to the same destination, using the same protocol, is defined as a flow. For example, many network switches support the IPFIX (IP Flow Information Export) standard, NetFlow (the Cisco-developed protocol on which IPFIX is based), and sFlow (an industry-standard packet-sampling protocol), among others. Flow-enabled devices export information about each flow to a flow collector, a software application that processes the flow data and presents it for analysis in graphical or tabular format. The traffic data exported to a collector is based on the packet headers only. It is highly condensed, usually about 1% to 5% of the switched network traffic. Nonetheless, it contains sufficient information to enable detailed analysis of traffic patterns and network utilization. Many collectors store the flow data in a database, creating a historical record that makes it possible to monitor changes and identify trends in network activity over a period of time.

Full packet capture works on the same principle as flow analysis, except that it takes a copy of each data packet flowing through the switch. Full packet capture is possible only with switches that support port mirroring. With full packet capture, it is possible to analyze network data in more depth than is possible with flow analysis, which captures only summarized packet headers. Several network core switches have the ability to copy network traffic from one port on the switch to another. This feature, which is called port monitoring or port mirroring, enables packet capture applications to capture traffic data for analysis.

Traffic analysis systems usually incorporate a database that acts as a historical record of network activity and enables network engineers to forensic analysis and troubleshooting that is impossible with a realtime instantaneous view of network activity. They are typically deployed on a dedicated machine because of the high network traffic throughput. Unfortunately, unlike LANGuardian, many full packet capture systems require bespoke hardware.

However, just as in a physical environment, it is necessary to monitor the servers in the virtual environment to diagnose and prevent application performance bottlenecks, security threats, unauthorized user behavior, and regulatory noncompliance. A virtual computing environment also poses additional technical challenges: (1) problems that affect one virtual server in the host can affect all others on the same host, (2) shared disk and memory structures can facilitate cross-appliance infection, (3) individual virtual machines are only as strong as the underlying host, (4) when virtual servers are moved to new environments, they can potentially compromise the security of their new environment, and (5) virtual machine images that have been unused for a while may not have the latest operating system updates and security patches installed. In addition to these technical challenges, there is often the very real organizational challenge that arises from the virtual environment and the network environment being managed by different teams. The physical network can be affected by events in the virtual environment and vice versa. Without insight into both, it is difficult to monitor the overall network effectively.

Packet capture is implemented in virtual environments by configuring the virtual NIC (network interface card) of the packet capture appliance to operate in promiscuous mode. By default, a NIC is configured to accept only the data packets that are intended specifically for it, but in promiscuous mode, a NIC will accept all data packets flowing through the switch.

In certain embodiments, the above approaches can be combined or amalgamated to configure and implement unified monitoring of a network by (1) installing the packet capture software as a virtual appliance in the virtual environment and configuring it to capture data from the physical network or (2) installing the packet capture software on a physical PC/server and capturing data from the virtual network. In the first approach, two virtual NICs are associated with the packet capture appliance. One of these NICs is connected to the same virtual as the other virtual machines hosted on the first virtual switch (virtual switch 1). The second virtual NIC on the packet capture appliance is connected to a dedicated virtual switch (virtual switch 2), which in turn is associated with a dedicated physical NIC that is connected to the monitoring port on the physical switch. Because the virtual NICs associated with the packet capture appliance are operating in promiscuous mode, they can see the traffic flowing through virtual switch 1 and virtual switch 2. In the second approach, a packet capture appliance in the virtual environment captures data from the virtual network switch. The virtualization server is connected to the core switch on the physical network, and the port to which it is connected is a monitored port. The packet capture appliance on the physical network, which is connected to the monitoring port, is therefore able to capture and store the traffic data from the virtual network.

LANGuardian is system that analyzes network traffic and provides a unique level of visibility into everything that is happening on the network, including user activity, file and database monitoring, intrusion detection, bandwidth usage, and Internet access. LANGuardian is primarily a full packet capture system, although it can also accept flow data. LANGuardian can be deployed on a standalone PC or server to monitor physical network traffic and to capture traffic from a virtual environment or deployed as a virtual appliance to monitor traffic in a virtual environment, and to capture traffic from a physical environment.

Network Sensors for Deep Packet Inspection (DPI)

Deep packet inspection (DPI) is an advanced method of examining and managing network traffic. DPI is a form of packet filtering that locates, identifies, classifies, reroutes, and/or blocks packets with specific data or code payloads that conventional packet filtering (which only examines packet headers) cannot detect. DPI can be used to check for malicious code. DPI typically requires one or more network sensors on client devices called network sensor hosts.

A network sensor captures network data traffic between users and infrastructure and between virtualized infrastructure resources. The raw network data traffic is then converted into valuable and actionable information (e.g., network metadata) that can provide significant security-based assessments and insights regarding the network, users of the network, devices operating on the network, and the like.

As previously noted, existing network sensor deployment paradigms are slow, computing resource intensive, and cumbersome. For example, it is a significant technical challenge to efficiently and successfully deploy network traffic sensors on multiple operating system distributions as existing deployment methodologies often require specialized hardware, on-premise management of interactions, specialized knowledge of network traffic analysis systems, user intervention for updates, and the like. What's more, existing network sensor deployment mechanisms are unfortunately exceptionally computing resource intensive, resulting in wasteful and redundant storage and bandwidth consumption to promptly collect, analyze, and act upon collected network metadata.

Disclosed herein are improved and optimized methods, systems, and processes to deploy on-premise network traffic sensors (referred to herein as simply sensors or network sensors) onto a variety of Linux distributions running on on-premise commodity physical servers or virtual machines. In some embodiments, the network sensor deployment can be interactive or unattended and the sensor deployment methodology includes the ability to configure and manage network sensors using a centralized cybersecurity cloud platform (e.g., the Insight Cloud Platform provided by Rapid7®, Inc., of Boston, Mass.). In other embodiments, the improvised and optimized network sensor deployment system provides on-premise (network) traffic analysis with in-cloud storage, provides for time-efficient rollout of traffic analysis sensors using commodity hardware devices, and uses a modified bootstrap, token service, ingress Application Programming Interface (API), agent (e.g., Insight Agent provided by Rapid7®, Inc., of Boston, Mass.), and other technical aspects of the centralized cybersecurity cloud platform. In addition to DPI, the deployed network sensors and the collected network metadata (e.g., from DPI, and other means) can be utilized for vulnerability management (VM), incident detection and response (IDR), log management, dynamic application security testing (DAST), penetration testing, security orchestration and automation (SOAR), and/or cloud security posture management (CSPM).

Example Network Sensor Deployment (NSD) Server

FIG. 1 is a block diagram 100 of a network sensor deployment (NSD) server 105, according to one embodiment. NSD server 105, which can be any type of physical or virtual computing device (e.g., a server or a virtual machine), generates, manages, and deploys a network sensor package (NSP) 110 (e.g., to one or more network sensor hosts (also called "sensor hosts" herein and not shown in FIG. 1)—which are other physical or virtual computing devices that are monitored in a deep packet inspection (DPI)-based cybersecurity environment). NSP 110 is transmitted from NSD server 105 to one or more sensor hosts causing a network sensor container (NSC) 120 to be deployed on one or more operating system (OS) distributions of the one or more sensor hosts (e.g., Linux distributions).

NSD server 105 performs network sensor deployment at least for DPI and includes at least a modified bootstrap 115, NSC 120 (as noted above), an agent 140, a gatekeeper service 145, a platform network sensor manager 150, a platform network sensor configuration service 155, a platform component configuration service 160, and an intrusion detection and response (IDR) and log search manager 165. In certain embodiments, NSD server 105, NSP 110, and NSC 120 facilitate and provide a self-service mechanism and system with at least: (a) a downloadable network sensor traffic analysis package from a cloud-based platform to on-premise Linux-based systems that can establish communication with a centralized cybersecurity cloud platform (e.g., the Insight Cloud Platform provided by Rapid7®, Inc., of Boston, Mass.—hereinafter referred to as "cloud platform"), (b) a single containerized network sensor package (e.g., NSP 110) that supports multiple operating system distributions (e.g., Linux distributions), (c) management and configuration capabilities via the cloud platform without requiring on-premise management of interactions, (d) no requirement specialist or domain knowledge of network traffic analysis systems (e.g., network traffic analysis system agnostic), and (e) automatic updates (e.g., of the sensor software and IDS rules without human intervention).

In one embodiment, modified bootstrap 115 is a bootstrap (e.g., a self-starting process) that is modified by NSD server 105 to support container components (e.g., components of a lightweight universal container runtime like runC, among others—which is a command line interface (CLI) tool for spawning and running open source containers).

Modified bootstrap 115 manages, starts, stops, and upgrades one or more network sensors (deployed on one or more network sensor hosts). NSD server 105 delivers NSC 120 in NSP 110 using OS-level virtualization. OS-level virtualization refers to an OS paradigm in which a kernel permits the existence of multiple isolated user space instances. Such instances are called containers (e.g., NSC 120 as disclosed herein and shown in FIG. 1, Solaris, Docker, and the like). In one embodiment, NSD server 105 provides a platform service that uses OS-level virtualization to deliver a network sensor deployment mechanism for DPI (e.g., to sensor hosts) in packages (e.g., NSP 110) called containers (e.g., NSC 120).

As shown in FIG. 1, NSP 110 includes at least modified bootstrap 115, NSC 120, and agent 140. Gatekeeper service 145 makes the latest version(s) of (container) component(s) available for modified bootstrap 115 for deployment (e.g., to one or more network sensor hosts). In certain embodiments, NSC 120 (e.g., which can be any type of container such as a Docker container, a Solaris container, or an Open Source Initiative (OCI) container, among others) includes at least: (a) a network sensor deployment (NSD) engine 125 (also referred to as "Magpie" herein), (b) a DPI engine 130 (also referred to as "Impala" herein and in priority application Ser. No. 62/910,745), and (c) an intrusion detection system (IDS) and intrusion prevention system (IPS) (e.g., Suricata, among others).

In one embodiment, NSC 120 includes NSD engine 125 (e.g., Magpie) for at least platform communication, configuration management and updates, job control, payload, log, and telemetry and event delivery, and error and exception handling. In another embodiment, NSC 120 includes DPI engine 130 (e.g., Impala) for at least high speed packet acquisition, Internet Protocol 4 (IP4) flow monitoring with high performance hash tables, content based application recognition (CBAR) for application protocol identification, Domaine Name System (DNS) analysis, and Dynamic Host Configuration Protocol (DHCP) analysis.

In some embodiments, platform network sensor manager 150 at least provides a downloadable network sensor installer package (e.g., NSP 110) and associated token, displays an 'initialize card' to permit a user to select a network sensor sniffing interface, and utilizes platform network sensor configuration service 155 to generate a configuration file. In this manner, one or more network sensor hosts are able to receive, download, and install NSP 110 and NSC 120.

In other embodiments, the management and sensor network adapters (e.g., of sensor hosts) are identified and confirmed by a user via platform network sensor configuration service 155. In this example, once network sensors are deployed, one or more (local) processes (e.g., on the sensor host) beacon via a Universal Beacon Ingestion Service and display the status and health of a network sensor including, but not limited to, link status, hostname, Media Access Control (MAC) address, traffic rates, drop rates, memory usage (e.g., on a given sensor host), and Switched Port Analyzer (SPAN) on/off status.

In certain embodiments, platform network sensor configuration service 155 builds, creates, and/or generates individual network sensor configuration files (hereinafter "configuration files") from user selected configuration and later (generated) IDF ruleset(s). Platform network sensor configuration service 155 then saves the configuration file(s) to platform component configuration service 160 (e.g., as shown in FIG. 1). In this example, platform component configuration service 160 retains and delivers configuration files for one or more network sensors deployed on one or more network sensor hosts.

Example Network Sensor Deployment for Deep Packet Inspection

In one embodiment, NSP 110 is received from NSD server 105 at a network sensor host (network sensor hosts are not shown in FIG. 1). The NSP 110 is installed on the network sensor host. Next, a NSC 120 is received from NSD server 105 (e.g., as part of NSP 110) and the contents of NSC 120 are executed on the network sensor host—thus, deploying a network sensor for DPI on the network sensor host.

In some embodiments, NSP 110 is associated with a token and utilizes the token to obtain a certificate and a private key to establish secure communications with NSD server 105 to receive NSC 120. Given the sensitive and confidential nature of network traffic, NSC 120 only deploys network sensors on network hosts that have an associated private key and certificate derived from a token associated with the network sensor package that includes the network sensor container. As noted, NSP 110 includes at least modified bootstrap 115, NSC 120, and agent 140—NSP 110 deploys the network sensor and modified bootstrap 115 starts NSC 120 on the network sensor host (e.g., after secure communications with NSD server 105 are established).

To accurately perform DPI, it can be necessary to segregate applications executing on a sensor host and processes associated with a host OS associated with the same sensor host. OS processes can taint a DPI process with active processes that do not necessarily involve network traffic interaction. Therefore, in other embodiments, NSC 120 isolates one or more network sensor applications executing on the network sensor host from a host OS associated with the network sensor host (e.g., to ensure that only applications associated with the deployed network sensor are considered for DPI purposes).

As noted, NSC 120 includes at least network sensor deployment engine 125 or Magpie, DPI engine 130 or Impala, and an intrusion detection system (IDS) 135 (which can also include an intrusion prevention system (IPS)). Magpie, Impala, and IDS 135 are transmitted from NSD server 105 as part of NSP 110 that includes NSC 120 and are deployed on a sensor host to manage and control the deployed network sensor on the sensor host. In this example, Magpie (e.g., network sensor deployment engine 125) determines that the network sensor is in deployment mode and enumerates one or more network interface cards (NICs) on the sensor host(s), transmits a topology status to NSD server 105, and requests a configuration file from NSD server 105 (e.g., configuration file generated by platform network sensor configuration service 155 and stored by platform component configuration service 160, as previously noted).

Next, NSD server 105 identifies the network sensor, selects a network interface to utilize as a sensor interface, generates the configuration file, and transmits the configuration file to the network sensor. The network sensor downloads (or receives) the configuration file (e.g., from NSD server 105), validates the configuration file, and initiates Impala (e.g., DPI engine 130) and IDS 135. Finally, the network sensor transmits (and is able to transmit) one or more network events from IDS 135 and network metadata from Impala to NSD server 105 (e.g., via a socket associated with the network sensor host, among other means).

Therefore, because individual network sensor configuration files are generated from one or more IDS and IPS rulesets, a deployed network sensor can segregate network metadata gathering via Impala to correlate to IDS and/or IPS rulesets (that can be updated on the fly) and/or network sensor applications (with isolated OS processes), while avoiding redundant data collection—thus saving significant memory, storage, and networking resources.

Figure 2:
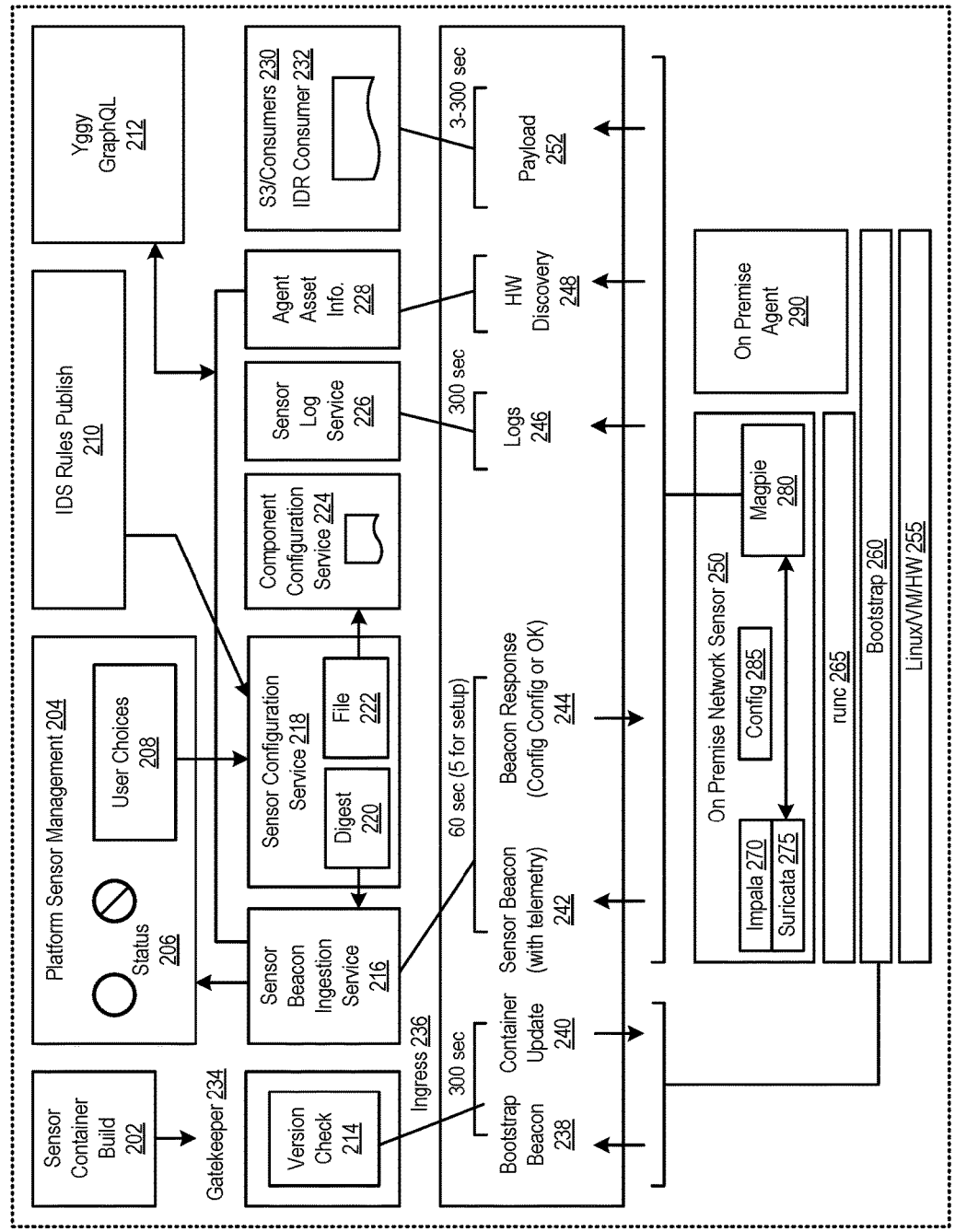
FIG. 2 is a block diagram 200 of a network sensor deployment (NSD) system, according to one embodiment of the present disclosure.

Example of Generating Network Metadata Using Configurable Deployed Network Sensors FIG. 2 is a block diagram 200 of a network sensor deployment (NSD) system, according to one embodiment. The NSD system shown in FIG. 2 is akin to NSD server 105 of FIG. 1 and contains at least the following components: a sensor container build 202, a platform sensor management 204 with status (indicators) 206 and user choices 208, IDS rules publish 210, a Yggy GraphQL 212, a version check 214, a sensor beacon ingestion service 216, a sensor configuration service 218 with a digest 220 and a file 222, a component configuration service 224, a sensor log service 226, agent asset information 28, and S3 consumers 230 and IDR consumers 232 (customer data/preferences/).

The NSD system of FIG. 2 also includes a gatekeeper 234, and performs ingress 236, bootstrap beacon(ing) 238, container update(s) 240, sensor beacon(ing) (with telemetry) 242, and beacon response 244 in addition to facilitating logs 246, hardware discovery 248 and payload 252 management. The deployed on premise network sensor 250 includes Impala 270 (for DPI), Suricata 275 (or any other type of IDS/IPS engine), config 285 (configuration file), and Magpie 280 (for deployment of on premise network sensor 250). In FIG. 2, NSC 120 is shown as runC 265, modified bootstrap 115 is shown as bootstrap 260, agent 140 is shown as on premise agent 290, and the network sensor host (or sensor host—which is not shown in FIG. 1) is shown as Linux/VM/HW 225.

In one embodiment, a location is identified on an on-premise network for deploying network data traffic analysis and provisions an on-premise sensor host (e.g., Linux/VM/HW 225—a Linux based system with two network adapters) and assigns an IP address to the management interface (e.g., platform sensor management 204 with user choices 208). Next, platform sensor management 204 is accessed and a network sensor installer package and associated token is downloaded and installed on the sensor host. A single token can be used for multiple installations and the installations do not require any user input—they can run unattended and are automated. The network sensor installer package (e.g., NSP 110) uses the token with platform token service to obtain a certificate and a private key to establish secure communication with platform sensor management 204. The network sensor installer package deploys bootstrap 260, on premise network sensor 250, and on premise agent 290 (as shown in FIG. 2).

In certain embodiments, bootstrap 260 starts runC 265. The network sensor container (e.g., runC container, among other container types), runs of multiple OS distributions (e.g., Linux distributions, among other OS distributions), and isolates one or more network sensor applications from the host operating system (as discussed above). Next, runC 265 starts the network sensor primary process—Magpie 280. In this example, Magpie 280 recognizes that on premise network sensor 250 is in "deployment mode" and enumerates one or more NICs, establishes a connection to NSD server 105 (e.g., the centralized cybersecurity cloud platform that includes platform sensor management 204 and sensor configuration service 218 as shown in FIG. 2), sends a topology status to platform sensor management 204, and requests a configuration file (e.g., file 222 from sensor configuration service 218 as shown in FIG. 2).

In one embodiment, the sensor host accesses platform sensor management 204, identifies the new network sensor (e.g., on premise network sensor 250 that has been deployed), and selects which network interface to use as the sensor interface (e.g., user choices 208)—thus providing a dedicated sensor interface for on premise network sensor 250. Doing so by the sensor host, causes a configuration file (e.g., file 222) to be offered to on premise network sensor 250 to be built, created, or generated by platform sensor management 204 and saved in component configuration service 224 (which is associated with sensor configuration service 218 and correlates the network sensor, the configuration file (e.g., file 222) and IDS/IPS rules (e.g., ISD rules publish 210) as shown in FIG. 2).

In another embodiment, on premise network sensor 250 downloads or accesses the configuration file, validates the configuration file, and starts Impala 270 (e.g., the DPI engine) and Suricata 275 (e.g., one of several types of contemplated IDS and/or IPS engines and rulesets). Suricata events and Impala 270 (network) metadata (e.g., flows and events) are then transmitted to Magpie 280 (e.g., the network sensor deployment engine) via the socket. Magpie 280 continuously: batches received events and flow into appropriately sized payload files, uploads payload files to the centralized cybersecurity cloud platform (e.g., NSD server 105) (where they are ingested by a lot search tool and an IDR tool), retries failed payload file uploads, transmits a regular beacon to the centralized cybersecurity cloud platform with current status and telemetry, uploads log files, uploads telemetry data, and checks for new configurations, downloads, and deployments as necessary.

In existing DPI and network data traffic collection and analysis implementations, network metadata (e.g., flows and events) are not available to a network sensor deployment mechanism (e.g., Magpie 280) to fine tune log searching and management as well as incident detection and response. Because NSC 120 deploys not only a network sensor but also mechanisms to fine tune, update, modify, and optimize the network sensor (e.g., Magpie 280 for network sensor deployment management, Impala 270 for DPI, and Suricata 275 for IDS rules)—the same network sensor that has been pre-configured to be managed and controlled by Magpie 280 post-deployment, the accuracy, efficiency, granularity, and speed of network metadata collection and subsequent analysis (e.g., based on IDS rules) is significant improved and optimized.

In certain embodiments, Impala 270, which performs DPI, provides event data collection and inspection as well as flow data collection and inspection. An event is typically a log of a specific action (e.g., a user login, a Virtual Private Network (VPN) connection, and the like) that occurs at a specific time and is logged at that given time. On the other hand, a flow is a record of network activity that can last for seconds, minutes, hours, or days, depending on the network activity within that (network) session. In this example, Suricata 275 or any other firewall or IPS, behaves as a log source and creates an event log (e.g., logs 246). Therefore, Magpie 280 is not merely a network sensor deployment mechanism, but also a network sensor management mechanism that deploys not just a network sensor on a sensor host, but also permits the sensor host to use the deployed network sensor to be (a) be pre-configured (e.g., with user choices 208, historical IDS/IPS data, targeted flow and event collection and inspection, and the like) and (b) fine-tuned, adjusted, and modified (e.g., based network metadata that includes live event and flow information correlated to and matched with a readily-available IDS ruleset).

For example, as noted above, Magpie 280 batches received events and flow (e.g., from Impala 270) into payload files (e.g., payload 252) and uploads the payload files to NSD server 105 for ingestion by DR and log search manager 165 (e.g., to perform intrusion detection and improve log search), transmits a regular beacon to NSD server 105 with current status and telemetry (e.g., sensor beacon 242 with beacon response 244), uploads log files (e.g., logs 246 a log data source such as Suricata 275), uploads telemetry data, and checks for new configurations, downloads, and deployments as necessary (e.g., so that the deployed sensor on the sensor host can be further optimized on the fly—without needing to deploy another separate sensor).

In existing sensor deployment paradigms that can even hypothetically or potentially be configured to perform DPI, the existing deployable sensors are not agnostic to the deployment environment because the sensor and corresponding sensor applications are not isolated and segregated from the host OS. What's more, existing deployable sensors are not pre-configurable (e.g., with historical configurations, user input, existing IDS rules, and the like) or post-configurable (e.g., with live or recently-obtained configurations such as updated network metadata and updated IDS rulesets). Finally, existing deployable sensors do not have access to a dedicated control and management mechanism on the host-side (where they are deployed).

NSP 110 and NSC 120 provide a containerized network sensor deployment mechanism (e.g., Magpie 280) that not only deploys a sensor on multiple OS distributions, but also facilitates the control and management of the sensor (e.g., in conjunction with a DPI engine and an IDS engine), while at the same time permitting a centralized cybersecurity cloud platform (e.g., NSD server 105) to readily use the collected network metadata for log search optimization and intrusion detection and response operations on the server-side. Therefore, Magpie 280 facilitates the deployment of an OS-agnostic, readily-distributable, and easily-updateable network traffic sensor that can be controlled and managed on the host-side to take advantage of Impala 270 and Suricata 275 (or any type of DPI tool/solution and any type of container technology, open source or not) and securely communicates with NSD server 105 to facilitate downstream log search and IDR operations on the server-side (in addition to providing new sensor configurations by virtue of Magpie 280 constantly updating NSD server 105 from a sensor host).

Example Process to Deploy a Network Sensor

Figure 3:
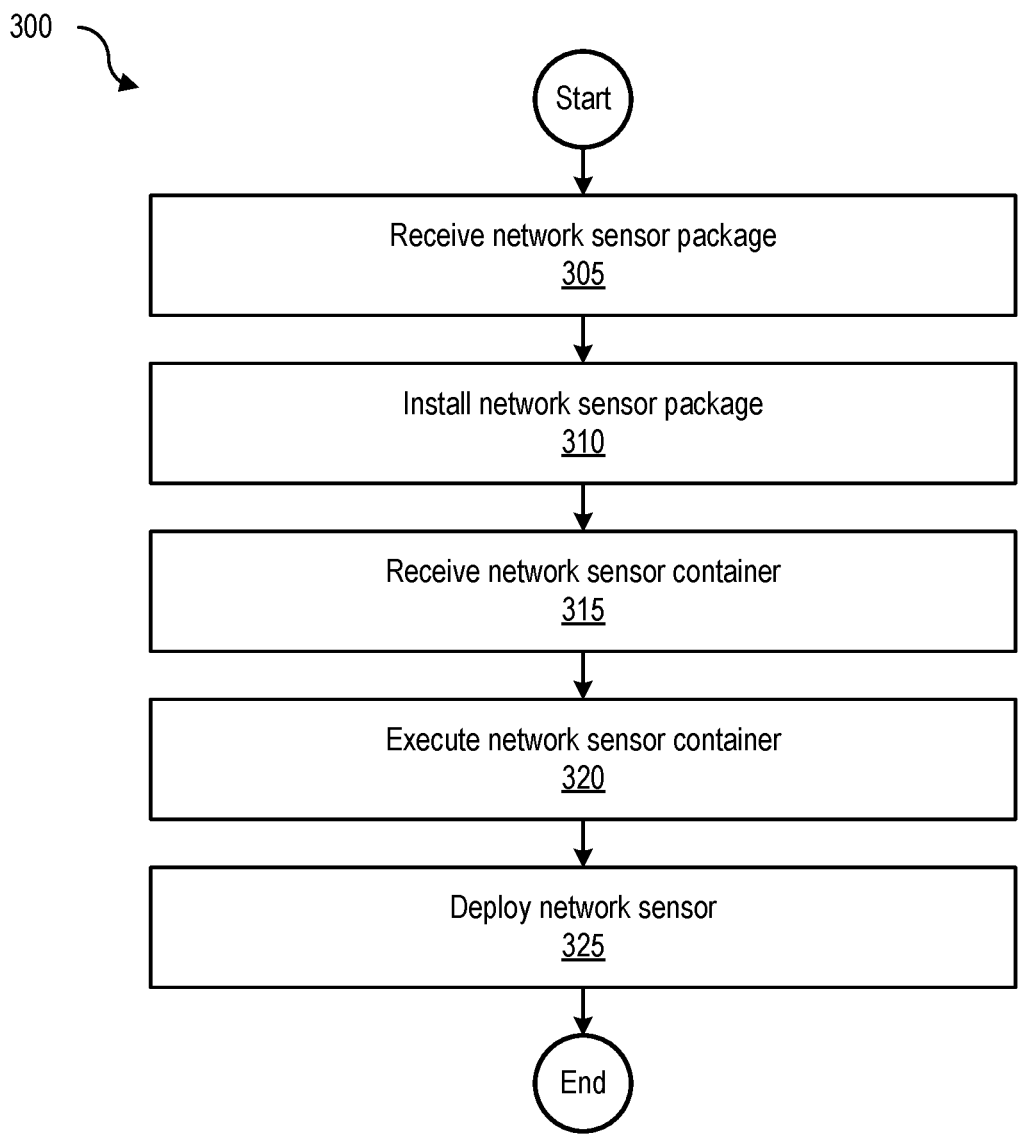
FIG. 3 is a flowchart 300 of a process to deploy (on-premise) network sensors, according to one embodiment of the present disclosure.

FIG. 3 is a flowchart 300 of a process to deploy (on-premise) network sensors, according to one embodiment. The process begins at 305 by receiving a network sensor package (e.g., NSP 110). For example, NSP 110 can be received or downloaded by a sensor host from NSD server 105. At 310, the process installs the network sensor package. Installation of the network sensor package causes, at 315, a network sensor container (e.g., NSC 120, which can be part of NSP 110) to be received (e.g., by the sensor host). At 320, the process executes the network sensor container and ends at 325 by deploying at least the network sensor (e.g., on-premise network sensor 250 in addition to Magpie 280, Impala 270, and Suricata 275).

Example Computing Environment

Figure 4:
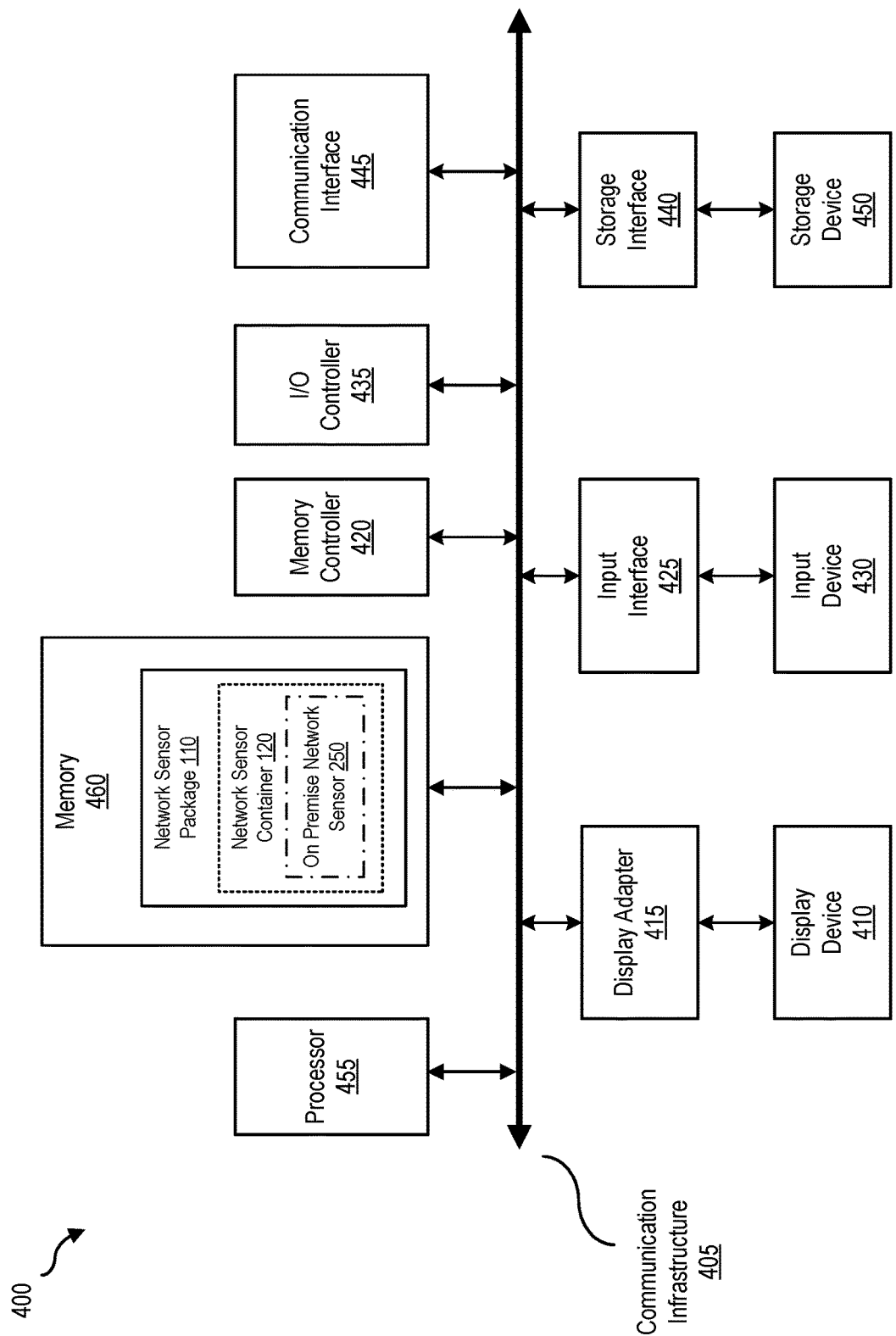
FIG. 4 is a block diagram 400 of a computing system, illustrating how a network sensor package and/or a network sensor container that implements one or more network sensors can be implemented in software, according to one embodiment of the present disclosure.

FIG. 4 is a block diagram 400 of a computing system, illustrating how a Deep Packet Inspection (DPI) engine 130 can be implemented in software, according to one embodiment. Computing system 400 can include NSD server 105 and/or one or more network sensor hosts (shown as sensor hosts 515(1)-(N) in FIG. 5) and broadly represents any single or multi-processor computing device or system capable of executing computer-readable instructions. Examples of computing system 400 include, without limitation, any one or more of a variety of devices including workstations, personal computers, laptops, client-side terminals, servers, distributed computing systems, handheld devices, and the like. In its most basic configuration, computing system 400 may include at least one processor 455 and a memory 460. By executing the software that executes DPI engine 130, computing system 400 becomes a special purpose computing device that is configured to deploy network sensors for DPI.

Processor 455 generally represents any type or form of processing unit capable of processing data or interpreting and executing instructions. In certain embodiments, processor 455 may receive instructions from a software application or module. These instructions may cause processor 455 to perform the functions of one or more of the embodiments described and/or illustrated herein. For example, processor 455 may perform and/or be a means for performing all or some of the operations, methods, or processes described and/or illustrated herein. Memory 460 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 400 may include both a volatile memory unit and a non-volatile storage device. In one example, program instructions implementing DPI engine 130 may be loaded into memory 460.

In certain embodiments, computing system 400 may also include one or more components or elements in addition to processor 455 and/or memory 460. For example, as illustrated in FIG. 4, computing system 400 may include a memory controller 420, an Input/Output (I/O) controller 435, and a communication interface 445, each of which may be interconnected via a communication infrastructure 405. Communication infrastructure 405 generally represents any type or form of infrastructure capable of facilitating communication between one or more components of a computing device. Examples of communication infrastructure 405 include, without limitation, a communication bus (such as an Industry Standard Architecture (ISA), Peripheral Component Interconnect (PCI), PCI express (PCIe), or similar bus) and a network.

Memory controller 420 generally represents any type/form of device capable of handling memory or data or controlling communication between one or more components of computing system 400. In certain embodiments memory controller 420 may control communication between processor 455, memory 460, and I/O controller 435 via communication infrastructure 405. In certain embodiments, memory controller 420 may perform and/or be a means for performing, either alone or in combination with other elements, one or more of the operations or features described and/or illustrated herein. I/O controller 435 generally represents any type or form of module capable of coordinating and/or controlling the input and output functions of a computing device. For example, in certain embodiments I/O controller 435 may control or facilitate transfer of data between one or more elements of computing system 400, such as processor 455, memory 460, communication interface 445, display adapter 415, input interface 425, and storage interface 440.

Communication interface 445 broadly represents any type/form of communication device/adapter capable of facilitating communication between computing system 400 and other devices and may facilitate communication between computing system 400 and a private or public network. Examples of communication interface 445 include, a wired network interface (e.g., network interface card), a wireless network interface (e.g., a wireless network interface card), a modem, and any other suitable interface. Communication interface 445 may provide a direct connection to a remote server via a direct link to a network, such as the Internet, and may also indirectly provide such a connection through, for example, a local area network. Communication interface 445 may also represent a host adapter configured to facilitate communication between computing system 400 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 400 may also include at least one display device 410 coupled to communication infrastructure 405 via a display adapter 415 that generally represents any type or form of device capable of visually displaying information forwarded by display adapter 415. Display adapter 415 generally represents any type or form of device configured to forward graphics, text, and other data from communication infrastructure 405 (or from a frame buffer, as known in the art) for display on display device 410. Computing system 400 may also include at least one input device 430 coupled to communication infrastructure 405 via an input interface 425. Input device 430 generally represents any type or form of input device capable of providing input, either computer or human generated, to computing system 400. Examples of input device 430 include a keyboard, a pointing device, a speech recognition device, or any other input device.

Computing system 400 may also include storage device 450 coupled to communication infrastructure 405 via a storage interface 440. Storage device 450 generally represents any type or form of storage devices or mediums capable of storing data and/or other computer-readable instructions. For example, storage device 450 may include a magnetic disk drive (e.g., a so-called hard drive), a floppy disk drive, a magnetic tape drive, an optical disk drive, a flash drive, or the like. Storage interface 440 generally represents any type or form of interface or device for transmitting data between storage device 450, and other components of computing system 400. Storage device 450 may be configured to read from and/or write to a removable storage unit configured to store computer software, data, or other computer-readable information. Examples of suitable removable storage units include a floppy disk, a magnetic tape, an optical disk, a flash memory device, or the like. Storage device 450 may also include other similar structures or devices for allowing computer software, data, or other computer-readable instructions to be loaded into computing system 400. For example, storage device 450 may be configured to read and write software, data, or other computer-readable information. Storage device 450 may also be a part of computing system 400 or may be separate devices accessed through other interface systems.

Many other devices or subsystems may be connected to computing system 400. Conversely, all of the components and devices illustrated in FIG. 4 need not be present to practice the embodiments described and/or illustrated herein. The devices and subsystems referenced above may also be interconnected in different ways from that shown in FIG. 4. Computing system 400 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 400 for storage in memory via a network such as the Internet or upon a carrier medium.

The computer-readable medium containing the computer program may be loaded into computing system 400. All or a portion of the computer program stored on the computer-readable medium may then be stored in memory 460, and/or various portions of storage device 450. When executed by processor 455, a computer program loaded into computing system 400 may cause processor 455 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 5:
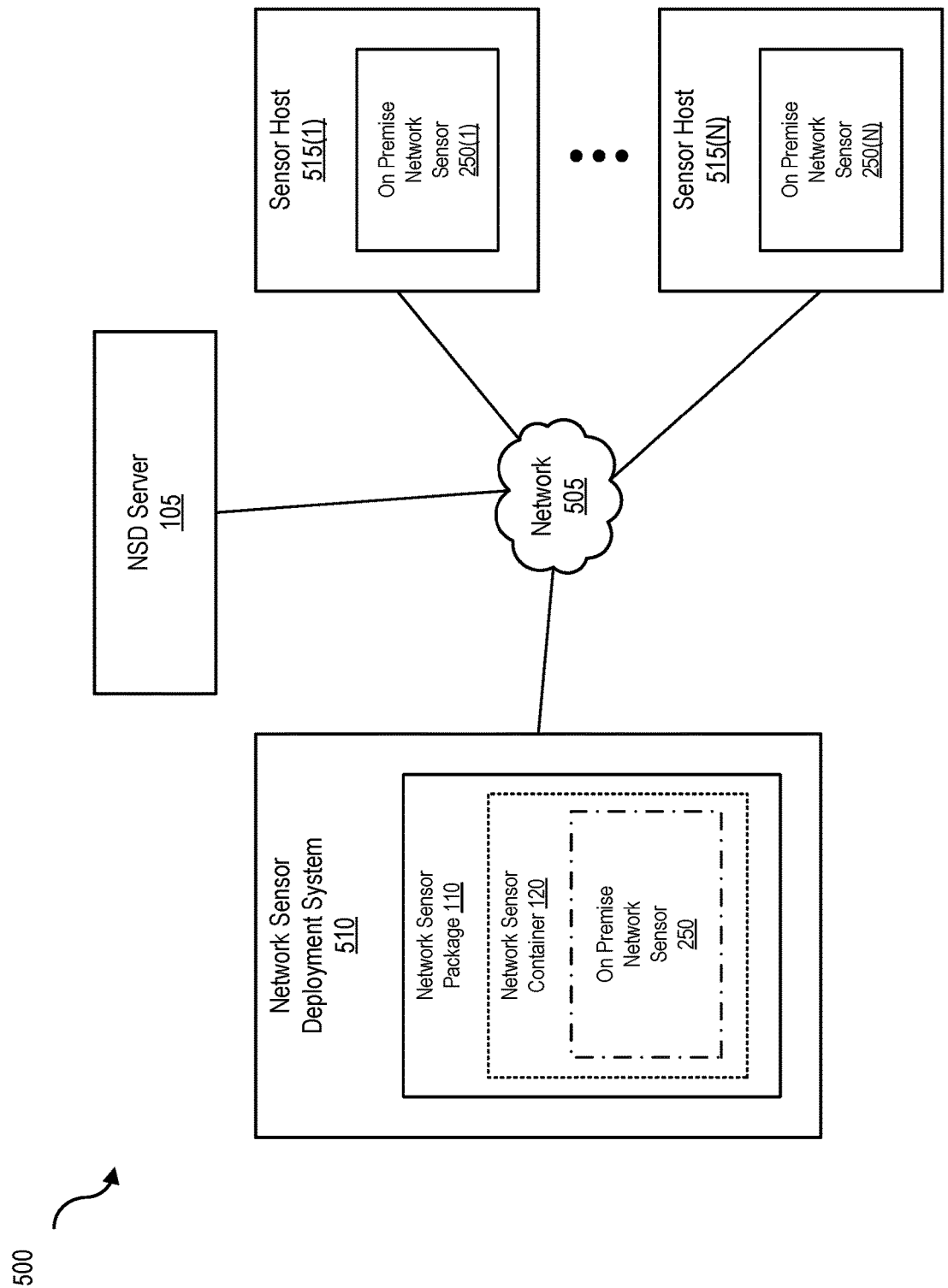
FIG. 5 is a block diagram 500 of a networked system, illustrating how various devices can communicate via a network, according to one embodiment of the present disclosure.

FIG. 5 is a block diagram of a networked system, illustrating how various computing devices can communicate via a network, according to one embodiment. Network 505 generally represents any type or form of computer network or architecture capable of facilitating communication between network sensor deployment system 510, NSD server 105, and/or sensor hosts 515(1)-(N). For example, network 505 can be a Wide Area Network (WAN) (e.g., the Internet) or a Local Area Network (LAN). In certain embodiments, a communication interface, such as communication interface 445 in FIG. 4, may be used to provide connectivity between network sensor deployment system 510, NSD server 105, and/or sensor hosts 515(1)-(N), and network 505. The embodiments described and/or illustrated herein are not limited to the Internet or any particular network-based environment. In some embodiments, DPI engine 130 may be part of NSD server 105 and/or sensor hosts 515(1)-(N), or may be separate. All or a portion of one or more of embodiments may be encoded as a computer program and loaded onto and executed or stored by network sensor deployment system 510, NSD server 105, and/or sensor hosts 515(1)-(N), or any combination thereof, and may be distributed over network 505.

In some examples, all or a portion of network sensor deployment system 510, NSD server 105, and/or sensor hosts 515(1)-(N) may represent portions of a cloud-computing or network-based environment (e.g., a centralized cyber-security cloud platform). Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, DPI engine 130 may transform the behavior of network sensor deployment system 510, NSD server 105, and/or sensor hosts 515(1)-(N) to perform network sensor deployment for DPI.

Example Local Area Network (LAN) Guardian System

Figure 6:
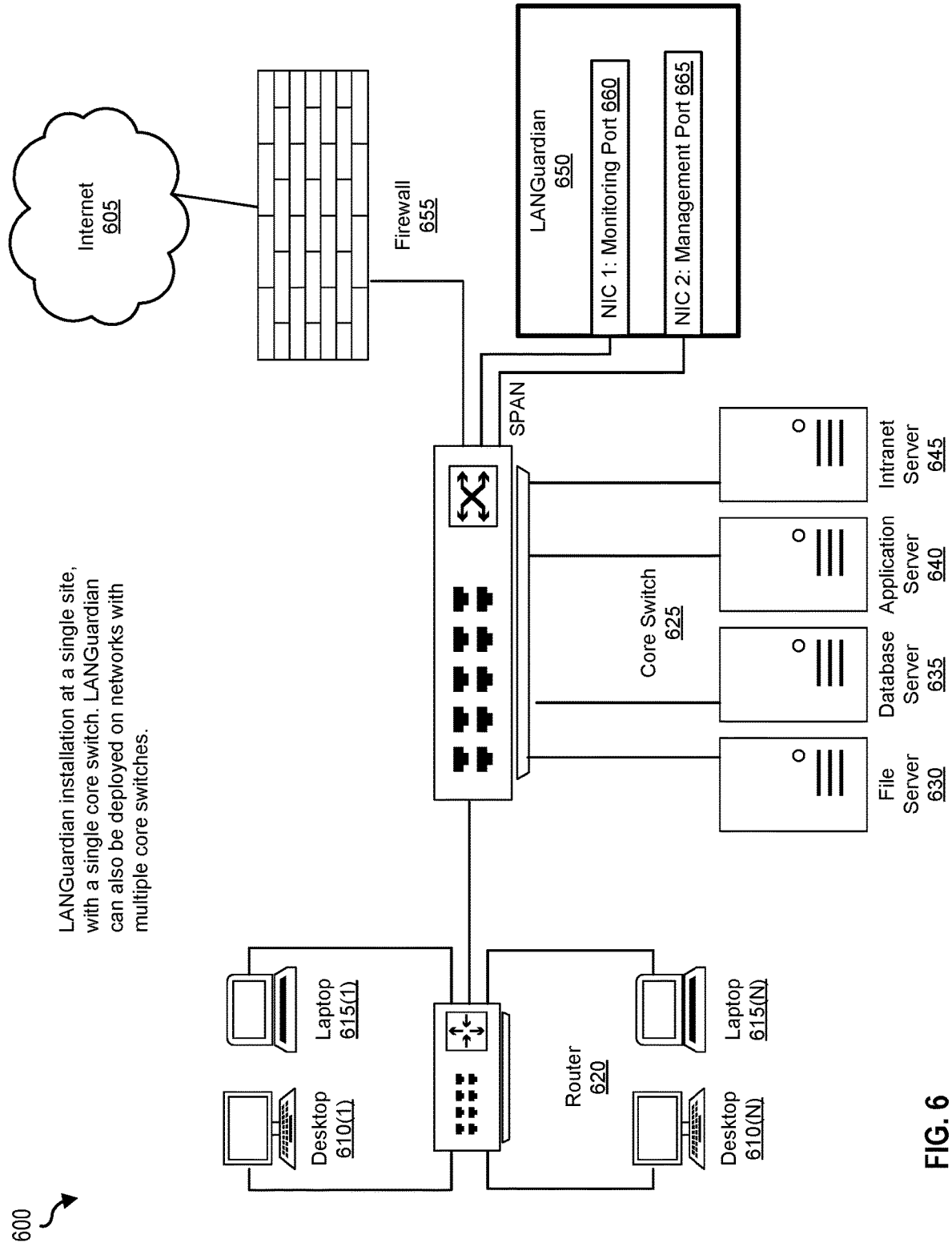
FIG. 6 is a block diagram 600 of a deep packet inspection (DPI) system that utilizes on-premise network sensors for DPI, according to one embodiment of the present disclosure.

FIG. 6 is a block diagram 600 of a deep packet inspection (DPI) system that utilizes on-premise network sensors for DPI, according to one embodiment. As shown in FIG. 6, desktops 610(1)-(N) and laptops 615(1)-(N) are communicatively coupled to a router 620. Router 620 is communicatively coupled to a core switch 625 that also supports Internet 605 access via a firewall 655 to a file server 630, a database server 635, an application server 640, and an intranet server 645. Core switch 625 is communicatively coupled to Internet 605 via firewall 655 and also includes two Switched Port Analyzer (SPAN) ports that are communicatively coupled to a Local Area Network (LAN) Guardian 650. LAN Guardian 650 includes a NIC 1: Monitoring Port 660 and a NIC 2: Management Port 665 for the two corresponding SPAN ports in core switch 625.

LAN Guardian 650 turns raw network traffic data into actionable cybersecurity information and includes four major components: (a) a traffic collection engine that captures network traffic from a SPAN port or other traffic source, (b) a traffic analysis engine (e.g., Impala 270 or DPI engine 130) that applies DPI techniques to consolidate and correlate data collected by the traffic collection engine, (c) a traffic database that stores the consolidated and correlated traffic data, and (d) a reporting engine that queries the traffic data and presents the data to a user (e.g., using custom reporting capabilities).

As shown in FIG. 6, a NIC on LAN Guardian 650 is connected to a monitoring port on a network's core switch (e.g., a SPAN or mirror port on core switch 625 as shown in FIG. 6). In one embodiment, LAN Guardian 650 automatically generates a network sensor to associate the NIC with DPI engine 130 and starts capturing network traffic. If there is a need to monitor traffic in multiple data centers but only a single interface is available, in some embodiments, LAN Guardian 650 deploys multiple remote network sensors as physical machines or virtual machines that deliver a single reference point to all user and network information.

In certain embodiments, DPI engine 130 performs two sequential checks on traffic packets. Content-based application recognition (CBAR), provided by DPI engine 130, recognizes applications and protocols regardless of the ports they use. In this example, targeted protocol decoding performs deeper analysis of commonly occurring traffic types—web, file share, and email traffic. If CBAR fails, DPI engine 130 stores the packet in a database as unrecognized traffic. If the CBAR check succeeds, DPI engine 130 proceeds to check for the existence of a targeted protocol decoder (e.g., web traffic, MSSQL, email, P2P, SMB fileshare, and the like).

In some embodiments, traffic stored in LAN Guardian's database is divided into three categories: (a) Unrecognized—traffic for which no CBAR application fingerprint or targeted decoder is available (for this traffic, LAN Guardian 650 stores the 5-tuple that uniquely identifies the TCP/IP connection {source IP address, source port, destination IP address, destination port, and protocol} and additional information such as username and DNS details, (b) Recognized—traffic for which a CBAR application fingerprint is available (for this traffic, LAN Guardian 650 stores the same information as it does for unrecognized traffic, along with additional information about the application associated with the traffic, and (c) Decoded—traffic that uses a protocol for which a LAN Guardian 650 decoder exists (for this traffic, LAN Guardian 650 stores the same information as it does for recognized traffic along with additional information specific to the protocol: (1) Email—sender, recipient, and subject information, (2) Web—URL of every page visited and file downloaded, and (3) Windows file share—file name, file size, and action details. The traffic analysis engine aggregates all the above information in (1), (2), and (3). Therefore, because LAN Guardian 650 works on traffic data directly via a SPAN or mirror port, LAN Guardian 650 does not require installation of client software or interaction with devices on a client network, and does not impact network performance.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method, comprising:
performing, by one or more computers that implement a network monitoring system:
sending a network sensor package to a network sensor host in a remote network, wherein
  the network sensor package is configured to execute a container that isolates applications executing in the container from an operating system of the network sensor host, and
  the applications include a network sensor deployment engine;
receiving, from the network sensor deployment engine, a request for a configuration file to configure to network sensor host;
generating the configuration file;
sending the configuration file to the network sensor deployment engine, wherein the network sensor deployment engine uses the configuration file to configure the applications; and
receiving sensor data about the remote network from the applications on the network sensor host.

2. The method of claim 1, wherein
the network sensor package is associated with a token, and
the network sensor deployment engine is configured to:
  use the token to obtain a certificate and a key, and
  establish secure communication with the network monitoring system using the key.

3. The method of claim 1, further comprising:
performing, by the network monitoring system:
receiving from the network sensor deployment engine an enumeration of network interfaces on the network sensor host; and
selecting one of the network interfaces as a sensor interface to communicate with the network sensor host.

4. The method of claim 1, wherein
the network sensor deployment engine is configured to send a topology status of the remote network along with the request for the configuration file.

5. The method of claim 1, further comprising:
performing, by the network monitoring system: identifying the network sensor host in response to the request for the configuration file.

6. The method of claim 1, wherein
the applications on the network sensor host include a deep packet inspection (DPI) engine.

7. The method of claim 1, wherein
the applications on the network sensor host include an intrusion detection system (IDS).

8. The method of claim 1, wherein
the network sensor package executes an agent on the network sensor host configured to send alerts about the network sensor host to the network monitoring system.

9. The method of claim 1, further comprising:
performing, by the network monitoring system:
analyzing sensor data to determine a security posture of the remote network; and
detecting a security vulnerability in the remote network based on the analysis.

10. The method of claim 1, further comprising:
performing, by the network monitoring system:
receiving, as part of the sensor data, logs of events on machines in the remote network; and
performing search requests on the logs via a log search manager implemented by the network monitoring system.

11. A system, comprising:
one or more computers that implement a network monitoring system, configured to:
send a network sensor package to a network sensor host in a remote network, wherein
the network sensor package is configured to execute a container that isolates applications executing in the container from an operating system of the network sensor host, and
the applications include a network sensor deployment engine;
receive, from the network sensor deployment engine, a request for a configuration file to configure to network sensor host;
generate the configuration file;
send the configuration file to the network sensor deployment engine, wherein the network sensor deployment engine uses the configuration file to configure the applications; and
receive sensor data about the remote network from the applications on the network sensor host.

12. The system of claim 11, wherein
the network sensor package is associated with a token, and
the network sensor deployment engine is configured to:
use the token to obtain a certificate and a key, and
establish secure communication with the network monitoring system using the key.

13. The system of claim 11, wherein
the network monitoring system is configured to:
receive from the network sensor deployment engine an enumeration of network interfaces on the network sensor host; and
select one of the network interfaces as a sensor interface to communicate with the network sensor host.

14. The system of claim 11, wherein
the network sensor deployment engine is configured to send a topology status of the remote network along with the request for the configuration file.

15. The system of claim 11, wherein
the network monitoring system is configured to identify the network sensor host in response to the request for the configuration file.

16. The system of claim 11, wherein
the applications on the network sensor host include a deep packet inspection (DPI) engine.

17. The system of claim 11, wherein
the applications on the network sensor host include an intrusion detection system (IDS).

18. The system of claim 11, wherein
the network sensor package executes an agent on the network sensor host configured to send alerts about the network sensor host to the network monitoring system.

19. One or more non-transitory computer-readable storage media storing program instructions that when executed on one or more processors implement a network monitoring system and cause the network monitoring system to:
send a network sensor package to a network sensor host in a remote network, wherein
the network sensor package is configured to execute a container that isolates applications executing in the container from an operating system of the network sensor host, and
the applications include a network sensor deployment engine;
receive, from the network sensor deployment engine, a request for a configuration file to configure to network sensor host;
generate the configuration file;
send the configuration file to the network sensor deployment engine, wherein the network sensor deployment engine uses the configuration file to configure the applications; and
receive sensor data about the remote network from the applications on the network sensor host.

20. The one or more non-transitory computer-readable storage media of claim 19, wherein the program instructions when executed on the one or more processors cause the network monitoring system to:
receive from the network sensor deployment engine an enumeration of network interfaces on the network sensor host; and
select one of the network interfaces as a sensor interface to communicate with the network sensor host.

* * * * *